United States Patent [19]

Raj et al.

[11] Patent Number: 4,628,384
[45] Date of Patent: Dec. 9, 1986

[54] BEARING ASSEMBLY WITH INTEGRATED FERROFLUID SEAL

[75] Inventors: Kuldip Raj, Merrimack; Raoul Casciari, Bedford, both of N.H.

[73] Assignee: Ferrofluidics Corporation, Nashua, N.H.

[21] Appl. No.: 569,189

[22] Filed: Jan. 9, 1984

Related U.S. Application Data

[63] Continuation-in-part of Ser. No. 526,781, Aug. 26, 1983, which is a continuation-in-part of Ser. No. 450,339, Dec. 16, 1982, Pat. No. 4,407,508.

[51] Int. Cl.$^4$ .............................................. G11B 5/012
[52] U.S. Cl. ...................................... 360/97; 277/80; 384/478
[58] Field of Search ...................... 360/97–99; 277/80; 384/478

[56] References Cited

U.S. PATENT DOCUMENTS 4,491,888 1/1985 Brown ................................... 360/97

FOREIGN PATENT DOCUMENTS 838223 6/1981 U.S.S.R. ............................... 384/478

*Primary Examiner*—S. J. Heinz
*Attorney, Agent, or Firm*—Richard P. Crowley

[57] ABSTRACT

A bearing assembly with an integrated single-stage ferrofluid seal apparatus incorporated therein, which assembly comprises a bearing assembly having an inner and outer race to define a raceway, a plurality of rolling elements retained within the raceway to permit rotation of the inner and outer races relative to one another, and a single-stage ferrofluid seal apparatus within the raceway and adjacent one side of the roller elements and which ferrofluid seal apparatus comprises a single-pole piece which extends into a close, noncontacting relationship with the surface of the inner or the outer race to define a radial gap, ferrofluid in the radial gap to form a ferrofluid seal, and an annular, permanent magnet secured to and adjacent the single-pole piece, the magnet having a generally-L sectional shape and in contact with one side and about one end of the pole piece to provide both a source of magnetic flux and as a magnetically insulating housing for the pole piece.

15 Claims, 2 Drawing Figures

BEARING ASSEMBLY WITH INTEGRATED FERROFLUID SEAL

REFERENCE TO PRIOR APPLICATIONS

This application is a continuation-in-part of U.S. Ser. No. 526,781, filed Aug. 26, 1983, which application is a continuation-in-part of U.S. Ser. No. 450,339, filed Dec. 16, 1982 (now U.S. Pat. No. 4,407,508, issued Oct. 4, 1983), both hereby incorporated by reference into this application.

BACKGROUND OF THE INVENTION

Bearing assemblies are employed to provide a sliding or rotating movement and typically provide support and permit rotation of a rotatable shaft element with a minimum of friction. For example, bearing assemblies, such as ball- or roller-bearing assemblies, are employed to support the spindle-disk-drive shaft employed to drive a computer magnetic disk which is read by a memory head. The computer disk and memory head must be protected from an outside environment, and typically a ferrofluid exclusion seal is employed, and such ferrofluid exclusion seals are employed as a separate component. While the ferrofluid exclusion seal used, for example, with a rotating shaft, such as a computer-disk drive shaft or spindle, is satisfactory, having the seal apparatus as a separate component, is not always satisfactory, particularly where space requirements are at a minimum.

Ferrofluid seal apparatuses, such as multiple-stage seal apparatuses, have been employed in conjunction with ball bearings to support a shaft, such as, for example, set forth in U.S. Pat. No. 3,620,584, issued Nov. 16, 1971. Further, ball-bearing assemblies have been employed using a magnetic ball bearing, in order to retain ferrofluid lubricants in place, such as set forth in U.S. Pat. No. 3,977,739, issued Aug. 31, 1976.

This application is a continuation-in-part of the single-pole-piece ferrofluid seal apparatus as described in U.S. patent application Ser. No. 450,339, filed Dec. 16, 1982 (now U.S. Pat. No. 4,407,508, issued Oct. 4, 1983), which application is hereby incorporated by reference. This application describes a single-pole-piece seal apparatus having a single magnetically permeable pole piece, an annular permanent magnet, means to secure the pole piece and the magnet together, and with one end of the pole piece extending into a close relationship with the surface of the shaft to be sealed, to define a radial gap, and ferrofluid disposed in the radial gap, to provide an exclusion seal or a pressure-type seal. The magnetic flux path of the single-pole-piece seal extends through the permanent magnet, the single pole piece, the ferrofluid in the radial gap, the shaft element to be sealed and an air gap between the shaft element and the other end of the permanent magnet, with typically the radial gap being shorter or less in gap length than the air gap. The single-pole-piece ferrofluid seal apparatus is particularly useful where space is at a premium, and where the shaft comprises a small-diameter, high-speed shaft element, and with the magnetic flux concentrated in the radial gap, the magnetic flux density in the air gap being quite small.

This application is also a continuation-in-part of U.S. Ser. No. 526,781, filed Aug. 26, 1983, which discloses and claims a bearing assembly with an integrated ferrofluid seal, which bearing assembly comprises: an inner and outer race; plurality of roller elements; means to retain the roller elements within the races; and a single-stage ferrofluid seal within the raceway to provide a ferrofluid exclusion seal; for example, to prevent the passage of ferrolubricants or lubricants employed in the bearing assembly into a contamination- or environmental-free area. In the bearing assembly of the parent application, a single-stage seal is employed and comprises a pole piece and an annular permanent magnet, together with a nonmagnetic permeable housing extending about a portion of the pole piece and the permanent magnet in order to provide and act as a magnetic flux insulator so as to divert magnetic flux toward the surface of the inner or outer race in which the ferrofluid seal is formed, since the inner and outer races are typically composed of a metal, that is, a magnetic permeable material.

Therefore, it is desirable to provide a bearing assembly having an integrated, single-pole-piece ferrofluid exclusion seal, wherein which bearing assembly is compact in design and is particularly useful where space requirements are important.

SUMMARY OF THE INVENTION

The invention relates to a bearing assembly containing an integrated ferrofluid seal, and more particularly the invention concerns a ball-bearing assembly containing an integrated, single-stage, single-pole-piece ferrofluid exclusion seal incorporated therein, and to a method of operating such a bearing assembly and to the computer-disk-drive system in which such bearing assembly is incorporated.

It has been discovered that a bearing assembly, particularly a ball-bearing assembly that incorporates an integral single-stage or single-pole-piece ferrofluid seal of compact and unique design may be formed without the requirement for a nonmagnetic housing for the single-stage ferrofluid seal. The bearing assembly with the single-stage ferrofluid seal of the invention provides for a permanent magnet which acts both as a source of magnetic flux which retains the ferrofluid in a radial gap to form the exclusion seal, and which also acts and performs the function of a housing. The single-stage ferrofluid seal generally has an L-shaped sectional permanent magnet with the annular permanent magnetic material placed adjacent one side of the pole piece and about one end of the pole piece to act as a housing for the pole piece.

It has been discovered that the annular permanent magnet material employed can be used as a housing element rather than a separate nonmagnetic housing element as required in the parent application, since the annular permanent magnet material, in its fully-magnetized condition and state, has a permeability which is not much greater than the magnetic permeability of air. Thus, employing the annular permanent magnet, both as a source of magnetic force and as a housing to shield the pole piece, even with some magnetic flux leakage, the pressure capacity of such a ferrofluid seal formed in a radial gap is much greter than a few inches of water which is the pressure typically required of an exclusion seal, such as an exclusion seal for a computer-disk-drive application. In the typical bearing assembly wherein the inner and outer races are formed of metal, the present invention permits the employment of a permanent magnet and eliminates the necessity of providing a nonmagnetic housing material for the single-pole piece in order to divert magnetic flux. The ferrofluid exclusion seal formed replaces the separate-component ferrofluid seal apparatus or the general elastomeric-type seals used in bearing assemblies.

The bearing assembly of the invention is particularly useful with computer-disk-drive spindles and computer-disk-drive applications, wherein a ferrofluid exclusion seal is required, in order to protect the memory head from particulate or other contamination.

The permanent magnet employed in the bearing assembly of the invention typically is a low-energy permanent magnet, such as a magnet composed of ceramic or polymeric material, such as a rigid elastomeric-type polymeric material containing magnetic particles. The annular permanent magnet may be formed of a rigid-type polymeric material, such as a nylon or other hard or moldable resins containing magnetic particles, or be formed of an elastomeric-type material, such as a material known as Plastiform sold by the 3-M Company, and which contains elastomeric material and magnetic-type particles dispersed therein. Such permanent magnets generally may have a energy product of from about 1.1 to 6.5 million gauss-oersteds. Generally, such permanent magnets provide for a flux density ranging from 2000 to 8000 gauss, for example, 2000 to 5000 gauss, in the air gap formed in the integrated single-pole-piece ferrofluid seal apparatus.

The bearing assembly and invention with an integrated ferrofluid seal thus comprises a bearing assembly adapted to surround, and to be secured to, a rotatable shaft element and having a magnetically-permeable inner and outer race and a spaced-apart outer race to define a race therebetween, and roller elements such as magnetically permeable ball bearings retained within the raceway by a cage or keeper to provide for rotation of the inner and outer races relative to one another. The bearing assembly includes a single-stage or single-pole-piece ferrofluid seal apparatus which comprises the ferrofluid seal apparatus placed within the raceway, generally closely adjacent the roller elements of the bearing assembly; includes a single-pole-piece having a one and another end, one end radially extending to a close, noncontacting relationship with the inner surface of the inner or the outer race to define a small radial gap. The radial gap may vary but generally ranges from about 2 to 6 mils. The ferrofluid seal apparatus also includes an annular, generally-axially-polarized permanent magnet, such as magnet machined or molded from a polymeric material, into the desired shape. The permanent magnet employed has a generally-L-shaped sectional configuration with the one end of the permanent magnet extending generally toward the same inner surface as the inner surface of the radial gap, to form an air gap with the inner surface. The air gap may be greater or less than the radial gap.

In one embodiment, it is desirable to extend the L-shaped permanent magnet so as to have the air gap less than the radial gap and so that the permanent magnet acts as a splash shield extending radially across the raceway to prevent lubricants from the bearing assembly from splashing into the ferrofluid seal, or prevent ferrofluid from splashing into the bearing assemblies. The permanent magnet is disposed in contact along one side of the pole piece and in a magnetic flux relationship with it, and the other end of the permanent magnet extends about the other end of the pole piece and generally adjacent and secured to the inner surface of the magnetically permeable inner or outer race, so as to act as a magnetic insulating housing to the other end of the pole piece opposite the radial gap.

A ferrofluid material, such as a low-volatility hydrocarbon- or ester-type ferrofluid material, is retained within the radial gap by the magnetic flux from the permanent magnet to form an exclusion-type seal with the exclusion seal generally between the bearing assembly and the environment to be protected, such as a computer-disk-drive environment. The magnetic flux circuit extends from the permanent magnet through the pole piece, the ferrofluid in the radial gap, the inner and outer race, across the air gap, and back to the permanent magnet. The thickness of the permanent magnet in the pole piece may vary, but generally the pole piece may range from about 20 to 80 mils, such as, for example, 20 to 60 mils; while the magnet would range in thickness from 30 to 150 mils, and generally from 40 to about 80 mils. The permanent magnet has an annular outside diameter greater than the annular outside diameter of the pole piece.

The invention will be described for the purposes of illustration only in connection with certain particular embodiments; however, it is recognized that various changes, additions, modifications and improvements may be made to the illustrated embodiments by those persons skilled in the art, but all falling within the spirit and scope of the invention.

DESCRIPTION OF THE EMBODIMENTS

Figure 1:
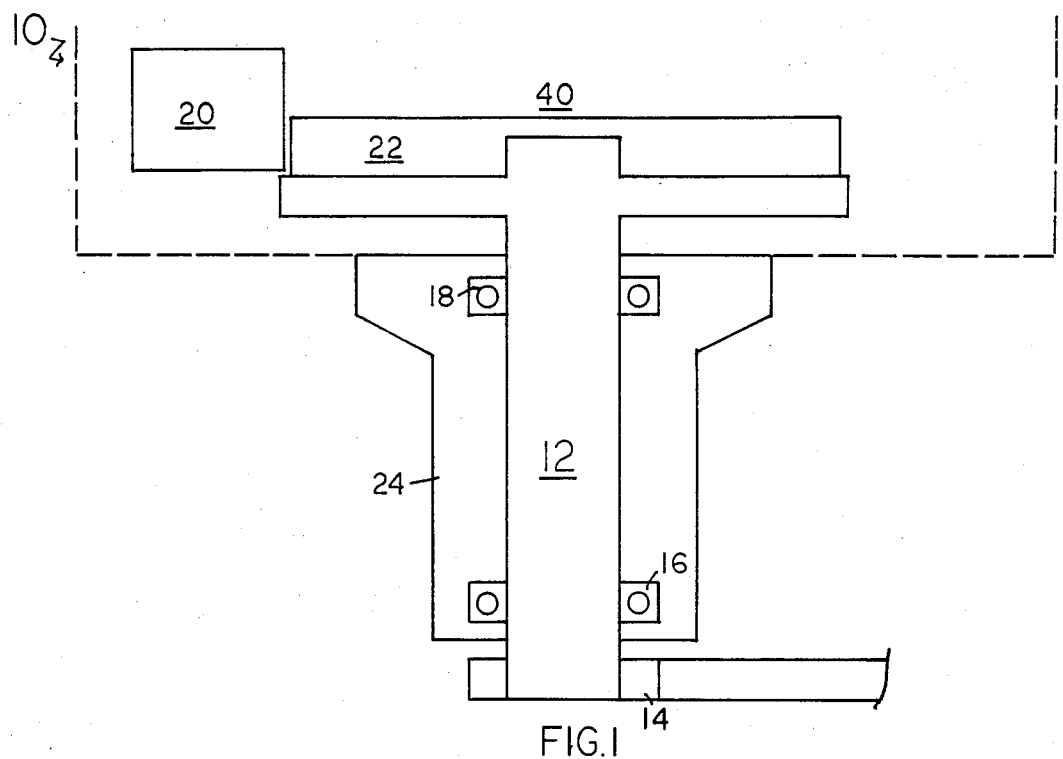
FIG. 1 is a schematic, perspective view of a computer-disk-drive system incorporating the bearing assembly with an integrated, single-stage ferrofluid seal of the invention.

FIG. 1 shows a computer-disk-drive-spindle system 10, which includes a bearing assembly with the integrated ferrofluid seal of the invention. The system includes a computer-disk-drive-spindle shaft 12 driven at high speed by a motor (not shown) usually by a belt and pulley arrangement 14. An air-bearing memory-disk pack 20, which rides on an air film, is positioned adjacent the top of the spindle shaft 12 by the disk 22 in a clean magnetic-disk area or chamber 40, shown as enclosed within the dotted lines, and maintained in a clean environment by filtered air or the use of an inert gas, such as helium. The spindle 12 is contained within a housing 24 and is supported by upper and lower bearing assemblies 16 and 18. Bearing assembly 16 may comprise a prior-art bearing, while bearing assembly 18 includes a ferrofluid exclusion seal and which bearing is described in more detail in FIG. 2.

Figure 2:
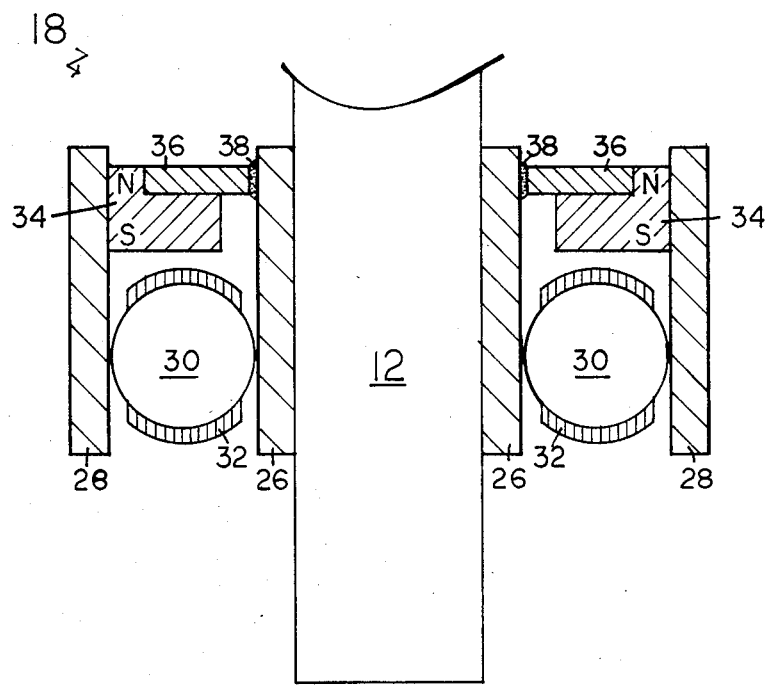
FIG. 2 is an enlarged, fragmentary, sectional view of the bearing assembly of FIG. 1 with the integrated single-pole-piece ferrofluid seal apparatus.

FIG. 2 is a sectional, enlarged, fragmentary view of the bearing assembly 18 which shows a magnetically permeable inner race 26 and an outer race 28 to define therebetween an annular raceway, which raceway contains a plurality of uniformly spaced, magnetically permeable ball bearings 30 retained within the raceway by a cage 32. A single-stage, single-pole-piece ferrofluid seal apparatus is disposed and positioned adjacent the raceway and between the bearing assembly and the environmental area 40. The single-stage seal comprises an L-shaped-type, annular, permanent magnet 34 composed of a rigid elastomeric or polymeric material which has been molded or machined into an L-shaped configuration, and a single-pole piece 36. The single-pole piece 36 extends at one end into a close, noncontacting relationship with the inner surface of the inner race 26 to define a radial gap of about 2 to 6 mils, and disposed within the gap and about the inner surface to form an exclusion seal is a ferrofluid 38 retained in the radial gap by magnetic flux from the permanent magnet 34. The permanent magent 34 is secured along substantially one side of the pole piece 36 and toward the ball-bearing cage 32 and about the other end of the pole piece 36 and to contact with the magnetically permeable inner surface of the outer race 28 to act as a housing while also acting as a source of magnetic flux.

In the embodiment illustrated, the permanent magnet has a thickness greater than the thickness of the pole piece and the air gap shown between the one end of the permanent magnet 34 and the inner surface of the inner race 26 is greater than the radial gap. The magnetic permeability of the magnetic material employed as the permanent magnet is, its fully magnetized state, is not much greater than air; therefore, and since the exclusion seal only requires a ferrofluid pressure-type seal, the permanent magnet acts as an insulating housing at the other end of the pole piece 36. The magnetic flux passes through the pole piece 36, the ferrofluid 38 in the radial gap, the magnetically permeable inner race 26, the air gap at the one end of the permanent magnet, and the permanent magnet 34. The extension of the permanent magnet 34 along the one side and secured to the one side of pole piece 36 also permits the permanent magnet to act as a splash shield and, if desired, may extend into a very-close, noncontacting relationship with the inner surface of race 26 and have an air gap smaller than the radial gap; for example, 1 to 2 mils.

The ball-bearing assembly as described, with the integrated, compact, single-stage ferrofluid seal therein, permits significant reduction in the overall length of the assembly over the employment of separate components to provide for a unique design wherein a nonmagnetic housing shield for the pole piece is not required.

What is claimed is:

1. A bearing assembly with an integrated ferrofluid seal, which bearing assembly comprises:
    (a) a bearing assembly adapted to surround a rotatable shaft and having an inner race and a spaced-apart outer race to define a raceway therebetween, and roller elements in the raceway and cage means to retain the roller elements in the raceway, to provide for the rotation of the inner and outer races relative to one another; and
    (b) a ferrofluid seal apparatus in the raceway and generally closely adjacent the roller elements of the bearing assembly, which ferrofluid seal apparatus comprises
        (i) a single magnetic pole piece having a one and another end, the one end radially extending into a close, noncontacting relationship with a surface of the inner or outer race to define a small radial gap,
        (ii) an annular axially-polarized permanent magnet having a radially disposed one end and another end relative to the axis of said shaft, the permanent magnet having a generally L-shaped cross-sectional configuration, the one end of the permanent magnet extending toward said radial gap to form an air gap with the said surface, said other end of said pole piece being in contact with the permanent magnet between arms of the L-shaped configuration, the permanent magnet having a permeability which is not much greater than the magnetic permeability of air and acting as a magnetic insulating housing about the other end of the pole piece, and
        (iii) ferrofluid retained in the radial gap by the magnetic flux from the permanent magnet, to provide a ferrofluid exclusion seal with said surface, the magnetic flux circuit passing between the pole piece, the ferrofluid in the radial gap, said surface, the air gap, and the permanent magnet.

2. The bearing assembly of claim 1 wherein the permanent magnet comprises a low-magnetic-energy, ceramic or polymeric permanent magnet.

3. The bearing assembly of claim 1 wherein the permanent magnet has an energy product of from about 1.1 to 6.5 million gauss-oersteds.

4. The bearing assembly of claim 1 wherein the magnetic flux density across the air gap ranges from about 2000 to 8000 gauss.

5. The bearing assembly of claim 1 wherein the ferrofluid comprises a hydrocarbon- or ester-based carrier liquid compatible with a lubricant employed with the roller elements.

6. The bearing assembly of claim 1 wherein the roller elements comprise ball bearings.

7. The bearing assembly of claim 1 which includes a rotatable shaft element extending through the inner race and secured thereto.

8. The bearing assembly of claim 1 wherein the pole piece has a thickness ranging from about 20 to 80 mils and the permanent magnet has a pole thickness which ranges from about 30 to 150 mils.

9. The bearing assembly of claim 1 wherein the air gap is less than the radial gap, whereby the permanent magnet extending on the one side of the pole piece between the pole piece and the bearing assembly also acts as a splash guard.

10. The bearing assembly of claim 1 wherein the radial gap is from about 2 to 6 mils.

11. The bearing assembly of claim 1 wherein the air gap is greater than the radial gap.

12. A computer-disk-drive system which comprises in combination:
    (a) the bearing assembly of claim 1;
    (b) a rotatable disk-drive-spindle shaft extending through the bearing assembly and secured to the inner race;
    (c) a memory-reading head in a protected environment;
    (d) a computer disk on the shaft and read by the reading head in the environment;
    (e) means to rotate the shaft; and
    (f) the ferrofluid seal having a radial gap formed with the inner surface of the inner race or the inner surface of the outer race positioned between the protected environment and the bearing assembly.

13. A bearing assembly with an integrated ferrofluid seal, which bearing assembly comprises:
    (a) a magnetically permeable bearing assembly adapted to surround a rotatable shaft and having an inner race secured to the shaft and a spaced-apart outer race to define an annular raceway therebetween, ball-bearing cages in the raceway, and ball bearings retained in the ball-bearing cage in the raceway, to provide for the rotation of the inner and outer races relative to one another; and (b) a single-stage ferrofluid seal apparatus in the raceway positioned generally closely adjacent the ball bearings, the ferrofluid seal apparatus comprising
  (i) a single magnetic pole piece having a one and another end, one end radially extending into a close noncontacting relationship with the surface of the inner or outer race to define a small radial gap,
  (ii) an annular, axially-polarized, polymeric or ceramic permanent magnet having a radially disposed one end and another end relative to the axis of said shaft, the permanent magnet having an L-shaped sectional configuration the one end of the permanent magnet extending toward said radial gap to form an air gap with said surface, said other end of said pole piece being in contact with the permanent magnet between arms of the L-shaped configuration, the permanent magnet material having an energy product of from about 1.1 to 6.5 million gauss-oersteds, and acting as a magnetic insulating housing about the other end of the pole piece, and
  (iii) ferrofluid retained in the radial gap by magnetic flux of the permanent magnet, to provide a ferrofluid exclusion seal with said surface of the inner or outer race, and whereby the magnetic flux circuit passes between the pole piece, the ferrofluid in the radial gap, the surface of the race, the air gap, and the permanent magnet.

14. The bearing assembly of claim 13 wherein the air gap is less than the radial gap, whereby the permanent magnet extending on the one side of the pole piece between the pole piece and the bearing assembly also acts as a splash guard.

15. A computer-disk-drive system which comprises in combination:
  (a) the bearing assembly of claim 13;
  (b) a rotatable disk-drive-spindle shaft extending through the bearing assembly and secured to the inner race;
  (c) a memory-reading head in a protected environment;
  (d) a computer disk on the shaft and read by the reading head in the environment;
  (e) means to rotate the shaft; and
  (f) the ferrofluid seal having a radial gap formed with the inner surface of the inner race or the inner surface of the outer race positioned between the protected environment and the bearing assembly.

* * * * *